United States Patent
Carpinisan et al.

(10) Patent No.: US 12,343,911 B2
(45) Date of Patent: Jul. 1, 2025

(54) MOLDED TANKS FORMED OF MULTIPLE MATERIALS

(71) Applicant: GM GLOBAL TECHNOLOGY OPERATIONS LLC, Detroit, MI (US)

(72) Inventors: Adrian Carpinisan, Milton (CA); Toni A. Rosa, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 9 days.

(21) Appl. No.: 18/446,147

(22) Filed: Aug. 8, 2023

(65) Prior Publication Data
US 2025/0050556 A1    Feb. 13, 2025

(51) Int. Cl.
| | | |
|---|---|---|
| *B29C 45/14* | (2006.01) | |
| *B29C 45/00* | (2006.01) | |
| *B29K 77/00* | (2006.01) | |
| *B60K 15/03* | (2006.01) | |
| *B29K 23/00* | (2006.01) | |
| *B29K 67/00* | (2006.01) | |
| *B29L 31/00* | (2006.01) | |

(52) U.S. Cl.
CPC .... *B29C 45/14336* (2013.01); *B29C 45/0001* (2013.01); *B60K 15/03177* (2013.01); *B29C 2045/1445* (2013.01); *B29K 2023/065* (2013.01); *B29K 2067/006* (2013.01); *B29K 2077/10* (2013.01); *B29L 2031/7172* (2013.01); *B60K 2015/03032* (2013.01)

(58) Field of Classification Search
CPC .......... B29C 45/14336; B29C 45/0001; B29C 2045/1445; B60K 15/03177; B60K 2015/03032; B29K 2023/065; B29K 2067/006

USPC .................................................. 220/45, 645
See application file for complete search history.

(56) References Cited

U.S. PATENT DOCUMENTS

| | | | |
|---|---|---|---|
| 2006/0011173 A1* | 1/2006 | Davis ............... | B60K 15/03177 220/749 |
| 2010/0316310 A1* | 12/2010 | Heater ............. | B60K 15/03177 383/119 |
| 2013/0082416 A1* | 4/2013 | Wakeman ............... | B29C 33/14 264/259 |

(Continued)

FOREIGN PATENT DOCUMENTS

| | | | | |
|---|---|---|---|---|
| DE | 102017125264 | A1 | 5/2019 | |
| EP | 3549805 | A1 * | 10/2019 | ............. B60K 15/03 |

(Continued)

OTHER PUBLICATIONS

German Office Action from counterpart DE1020231329251, dated Jan. 29, 2025.

*Primary Examiner* — Orlando E Aviles
*Assistant Examiner* — Niki M Eloshway

(57) ABSTRACT

A method of forming a molded tank configured to hold fluid in a vehicle is disclosed. The method includes providing a tank shell having a first material and creating a composite shell using a skeleton structure having a second material onto the tank shell, the second material different than the first material. The second material has a maximum operating temperature that is greater than a maximum operating temperature of the first material. Other examples methods of forming molded tanks and tanks configured to hold fluid in vehicles are also disclosed.

20 Claims, 4 Drawing Sheets

(56) References Cited

U.S. PATENT DOCUMENTS

2017/0008206 A1* 1/2017 Schoenhammer .. B29C 45/1418
2018/0259129 A1* 9/2018 Christ ....................... F17C 1/06

FOREIGN PATENT DOCUMENTS

| WO | WO-9815404 A1 * | 4/1998 | ....... B29C 45/14631 |
| WO | WO-2024115541 A1 * | 6/2024 | ............... B60K 1/04 |

* cited by examiner

MOLDED TANKS FORMED OF MULTIPLE MATERIALS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to molded tanks with multiple materials, and more particularly to molded vehicle tanks formed with tank shells and skeleton structures of different materials.

Vehicles include tanks for holding fluid. Some vehicle tanks may be used in conjunction with emissions control systems. For example, some vehicles include selective catalytic reduction (SCR) control systems having diesel exhaust fluid (DEF) tanks. Such tanks include shells formed of high-density polyethylene (HDPE). In some cases, the tanks include two HDPE shells welded together.

SUMMARY

A method of forming a molded tank configured to hold fluid in a vehicle is disclosed. The method includes providing a tank shell having a first material and creating a composite shell using a skeleton structure having a second material onto the tank shell, the second material different than the first material. The second material has a maximum operating temperature that is greater than a maximum operating temperature of the first material.

In other features, providing the tank shell having the first material includes molding the tank shell.

In other features, creating the composite shell includes overmolding the skeleton structure onto an interior side of the tank shell.

In other features, creating the composite shell includes overmolding the skeleton structure onto an exterior side of the tank shell.

In other features, creating the composite shell includes injecting molding the skeleton structure onto the tank shell.

In other features, the tank shell includes at least two portions, and the method further includes welding the at least two portions of the tank shell together.

In other features, creating the composite shell includes blow molding the tank shell over the skeleton structure.

In other features, creating the composite shell includes sequential overmolding the skeleton structure onto the tank shell to mix the second material and the first material.

In other features, providing the tank shell including providing the tank shell with at least one void, and creating the composite shell using the skeleton structure includes forming the skeleton structure into the at least one void to lock the tank shell and the skeleton structure together.

In other features, the first material includes high-density polyethylene.

In other features, the second material includes polybutylene terephthalate or nylon.

A tank configured to hold fluid in a vehicle is disclosed. The tank includes a tank shell and a skeleton structure overmolded onto the tank shell. The tank shell includes an interior side and an exterior side opposing the interior side. The tank shell defines a reservoir configured to hold fluid in the vehicle. The tank shell is formed of a first material and the skeleton structure is formed of a second material different than the first material. The second material has a maximum operating temperature that is greater than a maximum operating temperature of the first material.

In other features, the first material includes high-density polyethylene, and the second material includes polybutylene terephthalate or nylon.

In other features, the skeleton structure is disposed along at least a portion of the interior side of the tank shell.

In other features, the skeleton structure is disposed along at least a portion of the exterior side of the tank shell.

In other features, the tank is a selective catalytic reduction fluid tank or a fuel tank in the vehicle.

In other features, the tank shell includes at least two portions welded together.

A method of forming a molded tank configured to hold fluid in a vehicle is disclosed. The method includes providing a tank shell having high-density polyethylene, and molding a skeleton structure having polybutylene terephthalate or nylon onto an interior side or an exterior side of the tank shell.

In other features, molding the skeleton structure includes overmolding the skeleton structure onto the interior side or the exterior side of the tank shell.

In other features, the tank shell includes at least two portions, and the method further includes welding the at least two portions of the tank shell together.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
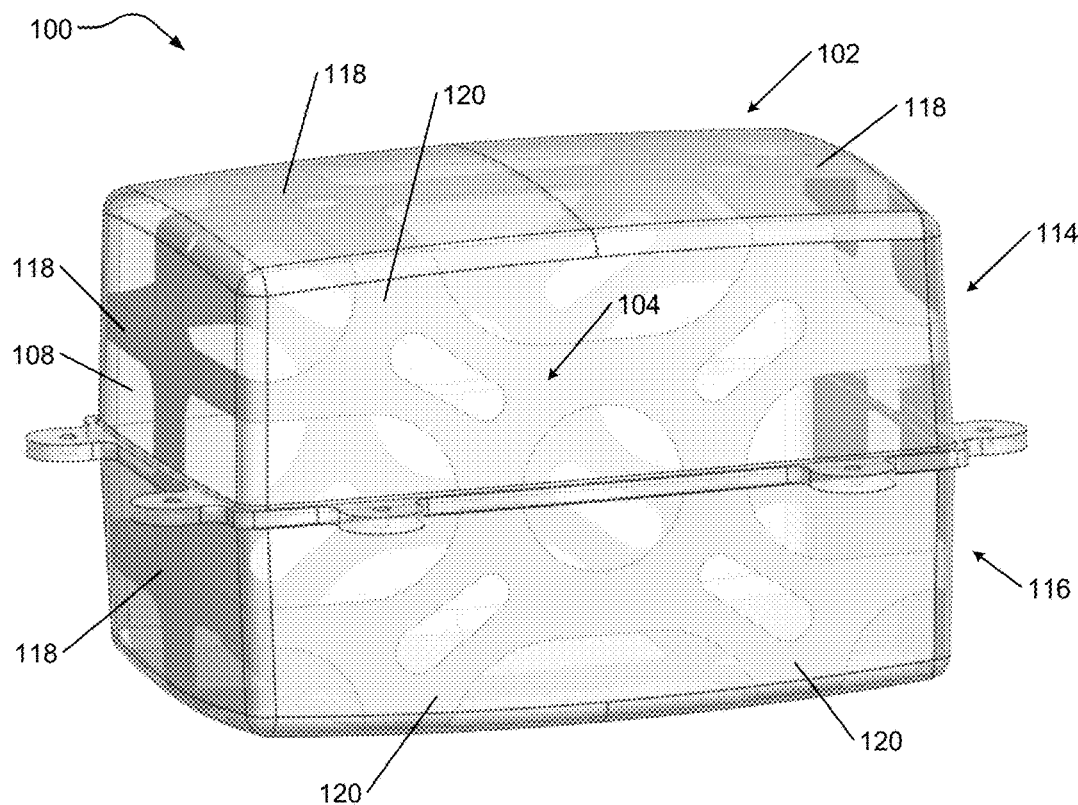
FIG. 1 is an isometric view of a conceptual example molded tank including a tank shell and a skeleton structure formed of different materials according to the present disclosure.

Vehicles include fluid tanks that may be used with emissions control systems. For example, selective catalytic reduction (SCR) control systems include tanks for holding diesel exhaust fluid (DEF). The tanks are often exposed to challenging thermal environments, such as high temperatures. Due to limits associated with the material used to form the tanks, performance of the tanks often suffers due to the exposure of high temperatures over a period of time. For example, high-density polyethylene (HDPE) is often used to form DEF tanks. The thermal capabilities of HDPE are generally −40° C. to 80° C. for continuous exposure and 90° C. as an excursion limit for a limited period of time. As such, when the tanks are exposed to high temperatures (e.g., over 90° C.), the structural integrity of the tanks may weaken causing the tanks to sag.

The tanks and methods according to the present disclosure includes solutions for improving the structural performance of the tanks by blending a skeleton structure and a tank shell formed of different materials. In such examples, the material used to form the skeleton structure has a better performance at higher temperatures than the conventional material used to form the tank shell, thereby preventing structural sagging of the tank due to thermal energy loads. In turn, the overall strength and structural integrity of the molded tank is improved while also allowing the tank to withstand the higher temperature without deforming as compared to conventional tanks.

For example, methods of forming molded tanks for holding fluid are disclosed herein. In various embodiments, the methods include providing a tank shell having a material, and overmolding a skeleton structure having another, different material onto the tank shell. In such examples, the skeleton structure material with higher performance characteristics than the tank shell material. For example, in some embodiments, the skeleton structure material can provide higher performance characteristics.

As explained herein, the skeleton structure material and the tank shell material may be any suitable different materials. For example, the tank shell material may be HDPE as is conventionally used with DEF tanks in vehicles. When HDPE is employed, the thermal capabilities of the tank shell may be generally −40° C. to 80° C. for continuous exposure and 90° C. as an excursion limit for a limited period of time. As such, in this example, the maximum operating temperature of the tank shell material may be about 90° C. Additionally, the skeleton structure material may be, for example, polybutylene terephthalate (PBT), nylon and/or another suitable thermoplastic polymer having higher performance characteristics than the tank shell material (e.g., HDPE, polypropylene, low-density polyethylene (LDPE), etc.). In either case, the maximum operating temperature of the skeleton structure material is greater than the maximum operating temperature of the tank shell material.

The skeleton structure may be overmolded onto the tank shell in various manners. For example, the skeleton structure may be overmolded by conventional molding processes, such as injecting molding, blow molding, and/or another suitable molding process. In such examples, the tank may be, for example, molded before the skeleton structure material is overmolded onto the tank shell or at generally the same time (e.g., substantially concurrently).

Additionally, the skeleton structure material may be overmolded onto an interior side and/or an exterior side of the tank shell. In such examples, the skeleton structure material may be selected to ensure the material does not conflict with fluid inside the tank and/or the environment surrounding the tank. For example, some materials may physically, chemically, etc. degrade and/or performance characteristics of the materials may degrade when exposed to particular fluids, environments, etc. As such, the skeleton structure material may be selected based on its intended position relative to the tank shell, fluids in the tank shell, the environment (e.g., chemical, physical and/or packaging constrains) around the tank, etc.

Further, in some examples, the methods of forming molded tanks may further include welding portions of the tanks together. For example, a tank shell of a molded tank may include separately formed portions. In such examples, the tank shell portions may be welded together through conventional methods after the portions are formed. In various embodiments, each tank shell portion may be separately overmolded with the skeleton structure material and then welded together.

The methods of forming molded tanks may include, for example, sequential overmolding or overlaying the different skeleton structure and tank shell materials. In such examples, the different materials may, at least partially, mix when a final shape of tank is formed. With such configurations, the tank with the mixed materials forms a composite blend with mechanical proprieties that will best the initial base material and extend the thermal operation range and/or improve the structural integrity of the tank.

In various embodiments, the tank shell and/or the skeleton structure may be molded with mechanical locking features. This may be useful when the materials do not adhere together or at least not sufficiently adhere together. Such lack of adhesion may occur depending on, for example, the materials employed, the types of molding processes employed, etc. The mechanical locking features may include voids (e.g., slots, grooves, etc.) and pins disposed in the voids, as further explained herein. For example, the tank shell may define one or more voids and the skeleton structure may include one or more corresponding pins that are formed in the voids when the skeleton structure material flows onto the tank shell, thereby mechanically interlocking the tank shell and the skeleton structure together.

Additionally, the tank shell and/or the skeleton structure may be molded with built-in features to compensate for shrinkage differences between the components. Such shrinkage differences may occur when the skeleton structure and the tank shell are formed with two different molding tools. In various embodiments, the tank shell and/or the skeleton structure may be molded with one or more hinges and/or other similar functioning features to compensate for shrinkage differences, as further explained herein.

Referring now to FIGS. 1-5, an example molded tank 100 is presented. In various embodiments, the molded tank 100 may be employed in a vehicle. In such examples, the molded tank 100 may be, for example, a DEF tank of a SCR control system in the vehicle. In other embodiments, the molded tank 100 may be employed in other applications other than vehicles, such as applications in which the tank is exposed to challenging thermal and/or structural environments (e.g., high temperatures, low ventilation, minimal air flow, vibration loads, etc.).

As shown in FIGS. 1-5, the molded tank 100 generally includes a tank shell 102 and a skeleton structure 104 disposed on the tank shell 102. More specifically, the skeleton structure 104 is overmolded onto a portion of an interior side 106 of the tank shell 102. In other examples, the skeleton structure 104 may be overmolded onto a portion of an exterior side 108 of the tank shell 102 if desired without departing from the scope of the disclosure.

In the example of FIGS. 1-5, the tank shell 102 and the skeleton structure 104 may be molded from different materials. In such examples, the skeleton structure material has a better performance at higher temperatures than the tank shell material. For example, the tank shell material may be HDPE as is conventionally used with DEF tanks in vehicles. In such examples, the skeleton structure material may be any suitable material having a higher maximum operating temperature than the tank shell material. In various embodiments, the skeleton structure material may be, for example, polybutylene terephthalate (PBT), nylon and/or another suitable thermoplastic polymers. In such examples, the maximum operating temperature (e.g., a long-term operating temperature) refers to a maximum temperature at which a material may be used, for a period of time, without a significant change in the material's properties. As such, when PBT or nylon and HDPE are employed, the skeleton structure 104 may be able to withstand a higher temperature over time as compared to the tank shell 102, thereby improving the overall strength and structural integrity of the tank 100 by providing structural support for the tank shell 102 and substantially preventing the tank shell 102 from sagging.

Figure 3:
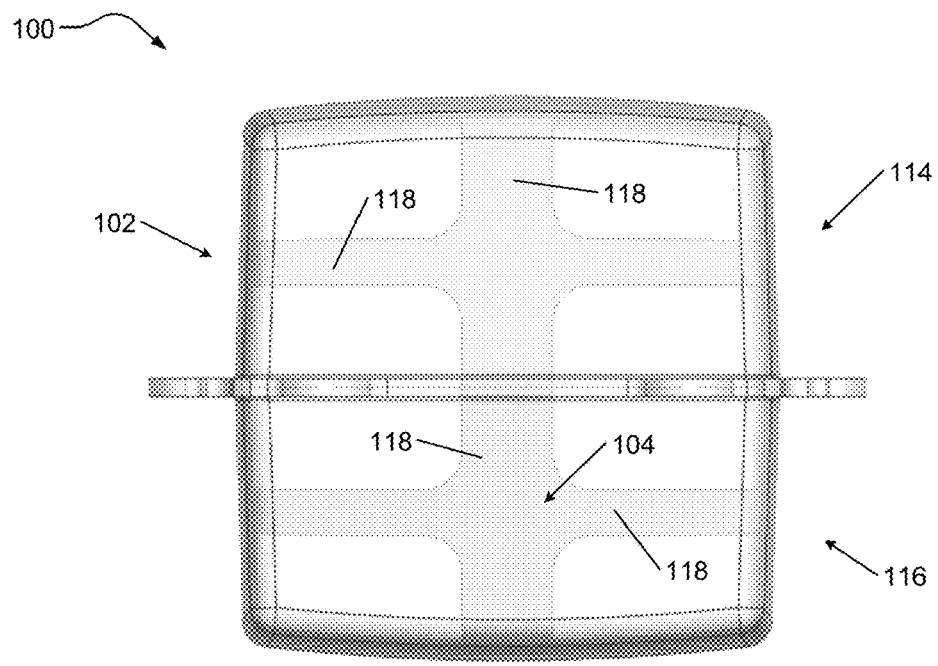
FIG. 3 is a side view of the molded tank of FIG. 1 according to the present disclosure.
Figure 4:
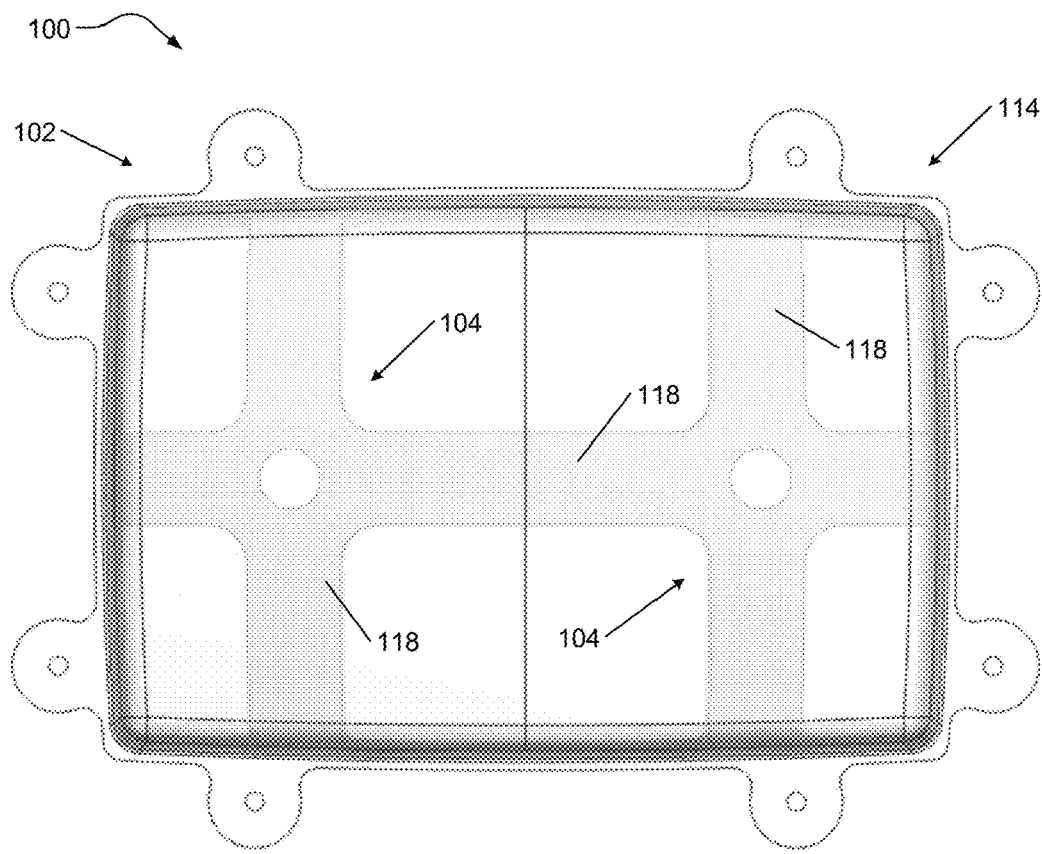
FIG. 4 is a top view of the molded tank of FIG. 1 according to the present disclosure.
Figure 5:
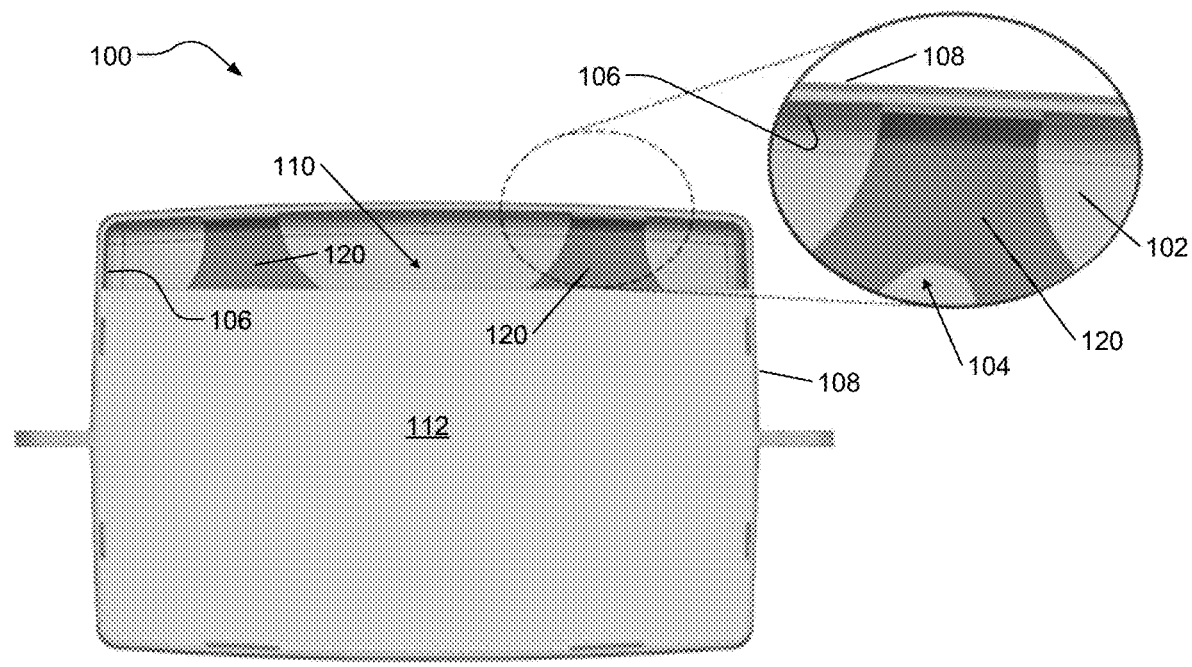
FIG. 5 is a front view of the molded tank of FIG. 1 with the tank storing fluid according to the present disclosure.

In the example of FIGS. 1-5, the molded tank 100 is shaped, sized, etc. to hold fluid. For example, and as shown in FIGS. 1-5, the molded tank 100 (e.g., the tank shell 102) is generally cuboid in shape. The interior side 106 of the tank shell 102 generally defines a reservoir 110 shaped, sized, etc. for holding vehicle fluid 112 (e.g., DEF, etc.), as shown in FIG. 5. While the molded tank 100 is shown in FIGS. 1-5 as being generally cuboid in shape, it should be appreciated that the tank 100 and/or any other tank herein may have another suitable shape for holding, storing, etc. fluid. For example, the tank 100 and/or any other tank herein may have any geometry, including a complex geometry if desired.

With continued reference to FIGS. 1-5, the skeleton structure 104 is overmolded onto the tank shell 102. The overmolding of the skeleton structure 104 onto the tank shell 102 may be accomplished in various manners. For example, and as explained herein, the skeleton structure 104 may be overmolded onto the tank shell 102 according to conventional molding processes, such as injecting molding the skeleton structure 104 onto the tank shell 102, blow molding the tank shell 102 over or under the existing skeleton structure 104 onto the tank shell 102, etc. In some examples, the tank shell 102 may be molded before the skeleton structure 104 is overmolded onto the tank shell 102 or at generally the same time (e.g., substantially concurrently).

Additional, in some embodiments, the tank 100 may be formed of two or more portions. For example, and as shown best in FIGS. 1-3, the tank shell 102 includes separately formed portions 114, 116. In such examples, the tank portions 114, 116 may be welded together through conventional methods after the portions 114, 116 are formed. In various embodiments, each tank portion 114, 116 may be separately overmolded with a portion of the skeleton structure 104, and then welded together. In other embodiments, the tank portions 114, 116 may be welded together, and then overmolded with the skeleton structure 104.

Figure 2:
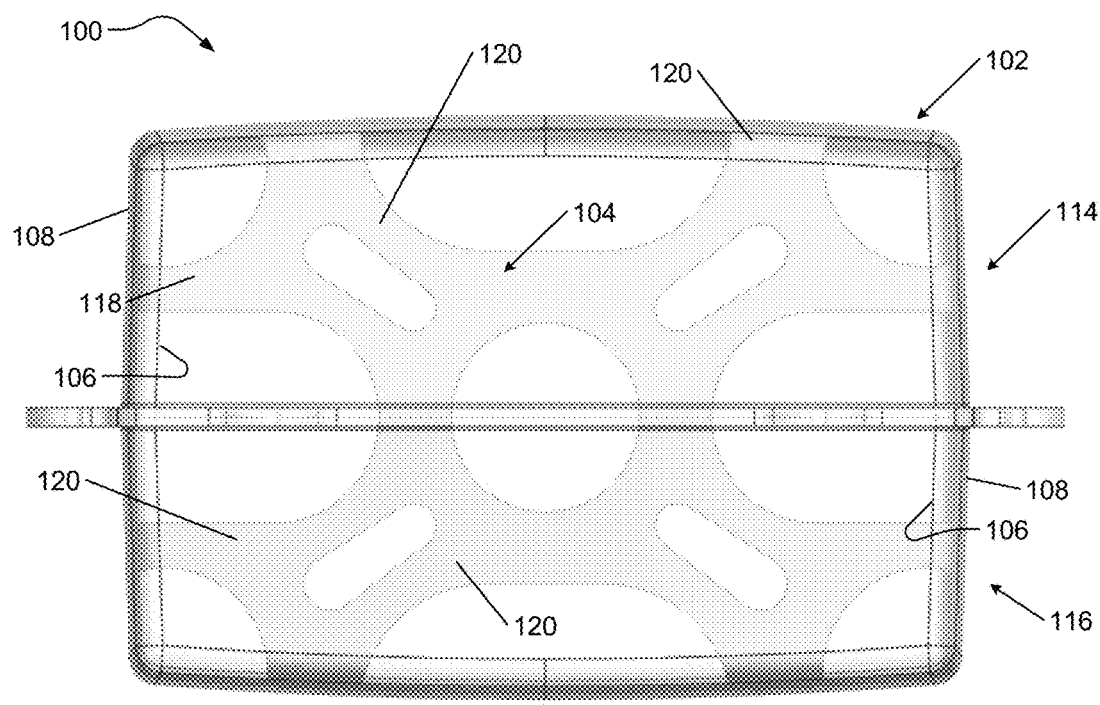
FIG. 2 is a front view of the molded tank of FIG. 1 according to the present disclosure.

As shown in FIGS. 1-5, the skeleton structure 104 is formed of multiple skeleton segments 118, 120. In such examples, the skeleton segments 118, 120 may be located in any suitable locations relative to the tank shell 102 to form the skeleton structure (e.g., frame) 104 based on, for example, design parameters of the tank 100. For example, in FIGS. 1-5, the skeleton segments 118, 120 are generally formed along sides of the tank shell 102 but not in corners of the tank shell 102. In such examples, the skeleton segments 118 may extend along top, bottom, and minor surfaces (e.g., along the interior side 106) of the tank shell 102 in directions generally parallel to edges of the tank shell 102 as shown in FIGS. 1 and 3-4. Additionally, the skeleton segments 120 may extend along major surfaces (e.g., along the interior side 106) of the tank shell 102 in generally diagonal directions between opposing corners of the tank shell 102, as shown in FIGS. 1-2. In other examples, the skeleton segments 118, 120 may be alternatively arranged relative to the tank shell 102.

Figure 6:
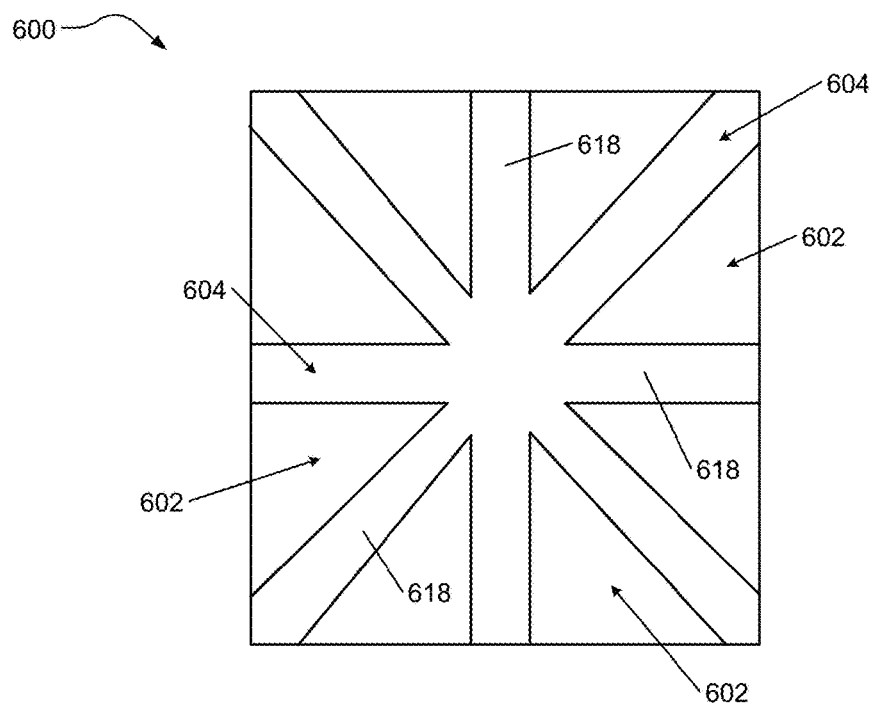
FIG. 6 is a front view of another example molded tank including a tank shell and a skeleton structure formed of different materials according to the present disclosure.

For example, FIG. 6 depicts another example molded tank 600 that is substantially similar to the molded tank 100 of FIGS. 1-5. For instance, the molded tank 600 includes a tank shell 602 and a skeleton structure 604 disposed on an exterior side of the tank shell 602. In such examples, the tank shell 602 and the skeleton structure 604 may be molded from different materials in a similar manner as the tank shell 102 and the skeleton structure 104 of FIGS. 1-5. However, in the example of FIG. 6, the skeleton structure 604 includes skeleton segments 618 disposed along the tank shell 602 in a different configuration than the skeleton segments 118, 120 of FIGS. 1-5. Specifically, in FIG. 6, a portion of the skeleton segments 618 generally extend towards and into corners of the tank shell 602.

In various embodiments, the skeleton structure materials and the tank shell materials described herein may adhere together chemically when the skeleton structure materials are overmolded onto the tank shell materials. In other embodiments, the materials may not adhere together (or at least not sufficiently adhere together) depending on, for example, the materials employed, the types of molding processes employed, etc. As such, one or more mechanical locking features may be employed to improve adhesion between the skeleton structure 104, 604 and the tank shell 102, 602. In such examples, the one or more mechanical locking features may be employed regardless of whether the materials adhere together chemically.

In some examples, the mechanical locking features may include voids (e.g., slots, grooves, etc.) and pins disposed in the voids. For instance, the tank shell 102 of FIGS. 1-5 may define at least one void, and the skeleton structure 104 may include a pin positioned in the void to interlock the tank shell 102 and the skeleton structure 104 together. In such examples, the void may be formed when, for example, the tank shell 102 is molded, and the skeleton structure material may fill the void, thereby forming the pin, when the skeleton structure 104 is overmolded onto the tank shell 102. In other examples, the skeleton structure 104 may define at least one void and the tank shell 102 may include a portion positioned in the void of the skeleton structure 104. Similar features may be present in the tank shell 602 and the skeleton structure 604 of FIG. 6.

Figure 7:
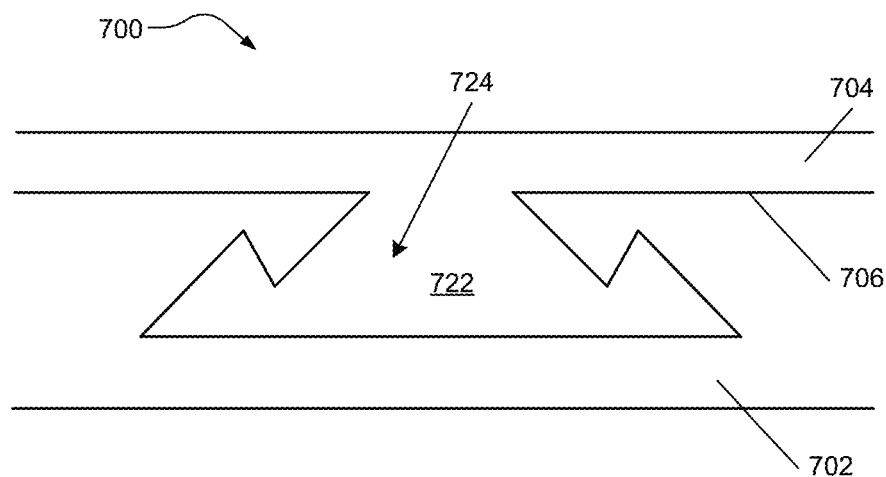
FIG. 7 is a front view of another example molded tank including a tank shell defining a void and a skeleton structure formed in the void according to the present disclosure.

As one example of such mechanical locking features, FIG. 7 depicts a portion of a molded tank 700 including a tank shell 702 and a skeleton structure 704 similar to the tank shell 102 and the skeleton structure 104 of FIGS. 1-5. In the example of FIG. 7, the tank shell 702 defines a void 722 extending from a surface 706 (e.g., an interior side or an exterior side) of the tank shell 702. Additionally, the skeleton structure 704 includes a portion (e.g., a pin, etc.) 724 extending into the void 722. As explained above, the portion 724 may be formed by filling the void 722 with the skeleton structure material when the skeleton structure 704 is overmolded onto the tank shell 702. The void 722 and the corresponding pin portion 724 may be employed in the molded tanks 100, 600 of FIGS. 1-6 if desired.

In various embodiments, the void 722 in the tank shell 702 may be sized, shaped, etc. in any suitable manner to form an interlocking arrangement with the skeleton structure

704. For example, in FIG. 7, the void 722 is generally defined by opposing nonparallel, diverging edges extending from the surface 706 and multiple ridges extending back towards the surface 706. When the void 722 is filled, the skeleton structure material flows throughout the void 722 and into apexes of the ridges to interlock the tank shell 702 and the skeleton structure 704. While the tank shell 702 of FIG. 7 is shown with a specific shaped void, it should be appreciated that any other suitable shaped void may be employed in the tank shell 702 (and/or another tank shell herein) or in the skeleton structure 704 (and/or another skeleton structure herein) if desired.

In some embodiments, any one of the skeleton structures herein and/or any one of the tank shells herein may include built-in features to compensate for shrinkage differences between the skeleton structure and the tank shell. Such shrinkage differences may occur when, for example, the skeleton structure and the tank shell are formed with two different molding tools. In various embodiments, the built-in features may include, for example, one or more hinges and/or other suitable structures to compensate for the shrinkage differences.

Figure 8:
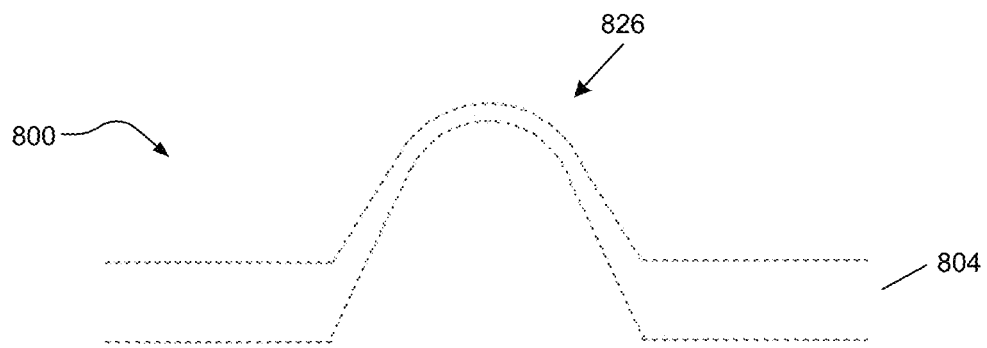
FIGS. 8-9 are example molded tanks each including a skeleton structure with a hinge for compensating for shrinkage according to the present disclosure.
Figure 9:
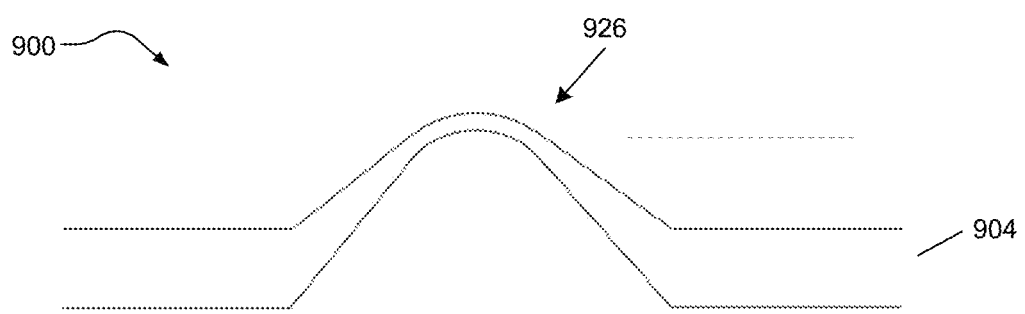

As one example of such shrinkage compensating features, FIGS. 8-9 depict a portion of a molded tank 800, 900, respectively, including a skeleton structure 804, 904 similar to the skeleton structure 104 of FIGS. 1-5. In the example of FIGS. 8-9, the skeleton structures 804, 904 include hinges 826, 926. With such example configurations, the skeleton structures 804, 904 may be able to flex due to the hinges 826, 926 and compensate for shrinkage differences between the skeleton structures 804, 904 and a corresponding tank shell (not shown). While the skeleton structures 804, 904 of FIGS. 8-9 are shown with specifically configured hinges, it should be appreciated that any other suitable hinge configuration may be employed in the skeleton structures 804, 904 (and/or another skeleton structure herein) or in any one of the tank shells herein if desired.

As explained herein, the molded tanks may be employed in vehicles, and in some embodiments, with SCR control systems in vehicles. While embodiments herein are described as employing the molded tanks with vehicles, it should be appreciated that the teachings herein of molded tanks including skeleton structures and tank shells formed of different materials may be applicable to non-vehicle implementations, such as implementations where a tank is subjected, exposed, etc. to challenging thermal environments (e.g., high temperatures, minimal air flow, etc.).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the others, even if that combination is not explicitly described. In other words, the described embodiments are not mutually exclusive, and permutations of one or more embodiments with one another remain within the scope of this disclosure.

Spatial and functional relationships between elements are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A tank configured to hold fluid in a vehicle, the tank comprising:
    a tank shell including an interior side and an exterior side opposing the interior side, the tank shell defining at least one void extending from one of the interior side or the exterior side towards the other one of the interior side or the exterior side, the void including an opening at the one of the interior side or the exterior side and a base portion opposing the opening, wherein the base portion is larger than the opening, the interior side of the tank shell defining a reservoir configured to hold fluid in the vehicle; and
    a skeleton structure overmolded onto and disposed on one of the interior side or the exterior side of the tank shell and into the at least on void of the tank shell via the opening;
    wherein the tank shell is formed of a first material and the skeleton structure is formed of a second material different than the first material, and wherein the second material has a maximum operating temperature that is greater than a maximum operating temperature of the first material.

2. The tank of claim 1, wherein:
the first material includes high-density polyethylene; and
the second material includes polybutylene terephthalate or nylon.

3. The tank of claim 2, wherein the skeleton structure is disposed on the interior side of the tank shell.

4. The tank of claim 2, wherein the skeleton structure is disposed on the exterior side of the tank shell.

5. The tank of claim 2, wherein the tank is a selective catalytic reduction fluid tank or a fuel tank in the vehicle.

6. The tank of claim 2, wherein the tank shell includes at least two portions welded together.

7. The tank of claim 1, wherein the skeleton structure includes at least one hinge configured to flex and compensate for a shrinkage difference between the skeleton structure and the tank shell.

8. A method of forming a molded tank, the molded tank configured to hold fluid in a vehicle, the method comprising:
    providing a tank shell having a first material, the tank shell including an interior side and an exterior side opposing the interior side, the tank shell defining at least one void extending from one of the interior side or the exterior side towards the other one of the interior side or the exterior side, the void including an opening at the one of the interior side or the exterior side and a base portion opposing the opening, wherein the base portion is larger than the opening; and creating a composite shell using a skeleton structure having a second material onto the tank shell, including disposing the skeleton structure onto on one of the interior side or the exterior side of the tank shell and into the at least on void of the tank shell via the opening, the second material different than the first material;

wherein the second material has a maximum operating temperature that is greater than a maximum operating temperature of the first material.

9. The method of claim 8, wherein providing the tank shell having the first material includes molding the tank shell.

10. The method of claim 9, wherein creating the composite shell includes overmolding the skeleton structure onto the interior side of the tank shell.

11. The method of claim 9, wherein creating the composite shell includes overmolding the skeleton structure onto the exterior side of the tank shell.

12. The method of claim 9, wherein creating the composite shell includes injecting molding the skeleton structure onto the tank shell.

13. The method of claim 12, wherein:
the tank shell includes at least two portions; and
the method further comprises welding the at least two portions of the tank shell together.

14. The method of claim 9, wherein creating the composite shell includes blow molding the tank shell over the skeleton structure.

15. The method of claim 9, wherein creating the composite shell includes sequential overmolding the skeleton structure onto the tank shell to mix the second material and the first material.

16. The method of claim 8, wherein the first material includes high-density polyethylene.

17. The method of claim 16, wherein the second material includes polybutylene terephthalate or nylon.

18. A method of forming a molded tank, the molded tank configured to hold fluid in a vehicle, the method comprising:
providing a tank shell having high-density polyethylene, the tank shell including an interior side and an exterior side opposing the interior side, the tank shell defining at least one void extending from one of the interior side or the exterior side towards the other one of the interior side or the exterior side, the void including an opening at the one of the interior side or the exterior side and a base portion opposing the opening, wherein the base portion is larger than the opening; and
overmolding a skeleton structure having polybutylene terephthalate or nylon onto an interior side or an exterior side of the tank shell and into the at least on void of the tank shell via the opening.

19. The method of claim 18, wherein molding the skeleton structure includes overmolding the skeleton structure onto the exterior side of the tank shell.

20. The method of claim 18, wherein:
the tank shell includes at least two portions; and
the method further comprises welding the at least two portions of the tank shell together.

* * * * *